3,752,716
PROCESS FOR THE PRODUCTION OF PRESSURE-SENSITIVE ADHESIVES

Yasuhiro Moriyama and Takafumi Okamoto, Osaka, Japan, assignors to Nitto Electric Industrial Co., Ltd., Osaka, Japan
Filed May 10, 1971, Ser. No. 141,562
Claims priority, application Japan, May 9, 1970, 45/39,479
Int. Cl. B32b 31/20; B44d 1/092, 1/44
U.S. Cl. 156—3   19 Claims

ABSTRACT OF THE DISCLOSURE

A process for the production of a pressure-sensitive adhesive having a fluorocarbon resin film as the support, which comprises treating at least one surface of a fluorocarbon resin film to provide adhesivity to the surface, applying a pressure-sensitive adhesive material to the surface of the film thus treated, superposing a fluorocarbon resin film on the adhesive layer thus formed, and compression rolling the laminate using rolls heated to temperatures of higher than 25° C. and lower than the melting point of the fluorocarbon resin is disclosed.

BACKGROUND OF THE INVENTION

(1) Field of the invention

Figure 1:
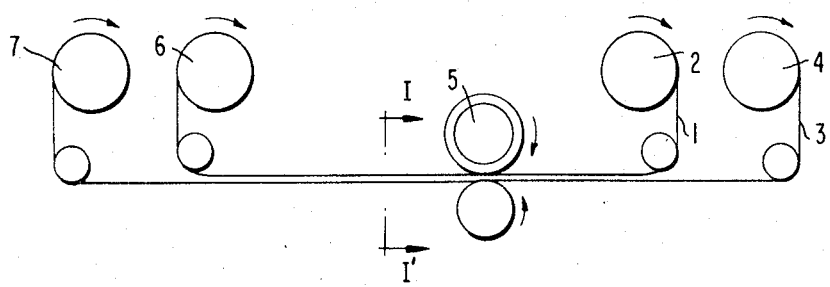

The present invention relates to a process for the production of a pressure-sensitive adhesive and more particularly it relates to a process for the production of a pressure-sensitive adhesive having a thin fluorocarbon resin film as the support.

(2) Description of the prior art

A fluorocarbon polymer or resin is an expensive plastic but because the fluorocarbon polymer has excellent properties such as heat resistance, chemical resistance, and a non-adhesive property that have not been obtained in other plastics, the polymer is actively utilized in fields such as electrical engineering relying on the aforesaid properties, e.g., as electric insulating materials, heat resisting materials, and non-adhesive materials.

When a fluorocarbon resin film is used as a coating material for, e.g., the surface of a roll, it frequently happens that the adhesive property of the film becomes an important problem. And in such case, a method is employed to produce a fluorocarbon resin film having on one side thereof a pressure-sensitive adhesive layer in which a side of the fluorocarbon resin film is subjected to an etching treatment by a known manner, such as by treating it with a solution of sodium-naphthalene-tetrahydrofuran complex or a sodium-liquid ammonia solution and then applying to the etched surface a solution of a pressure-sensitive adhesive material, such as a silicone resin followed by drying. However, since the viscosity of the molten fluorocarbon resin, particularly tetrafluoroethylene polymers is high, it is impossible to obtain a film of such a polymer by means of a melt extrusion or a calendar molding operation. Therefore, specific molding methods have been employed and they are generally classified into three types (1) a cutting method, (2) a rolling method, and (3) a casting method. Among them, however, the cutting method is most generally used. The thickness of the tape obtained is generally thicker than 50 microns in the cutting method and the rolling method and 3–100 microns in the casting method. Hence it is quite difficult to obtain a support for a very thin pressure-sensitive adhesive having a thickness of less than 50 microns by the methods mentioned above due to the difficulties that the mechanical strength of the support is insufficient or the support is readily creased during the etching treatment or the coating treatment of a pressure-sensitive adhesive material. Furthermore, in the case of a tape obtained by the cutting method, the mechanical strength, such as the tensile strength, and also the electrical strength, such as the dielectric breakdown potential, are greatly reduced as the thickness of the tape is reduced, causing troubles from a practical standpoint.

An object of this invention is to provide a process for producing readily a pressure-sensitive adhesive film having high mechanical strength and electrical strength and a very thin thickness.

SUMMARY OF THE INVENTION

That is, according to the process of this invention, a pressure-sensitive adhesive film having a fluorocarbon resin film as the support is produced by treating at least one surface of a first fluorocarbon resin film to provide adhesive power to the surface, applying to the surface thus treated a pressure-sensitive material, superposing a second fluorocarbon resin film on the layer of the adhesive material, and compresion rolling the assembly by rolls heated to a temperature of from 25° C. to the melting point of the fluorocarbon resin.

By the aforesaid process of this invention, a pressure-sensitive adhesive film having excellent mechanical and electrical properties and a very thin support of about 15–40 microns in thickness can be obtained.

BRIEF DESCRIPTION OF THE ACCOMPANYING DRAWINGS

Now, the invention will be explained by referring to the accompanying drawings, in which FIG. 1 is a schematic view showing an embodiment of the production step of this invention.

Figure 2:
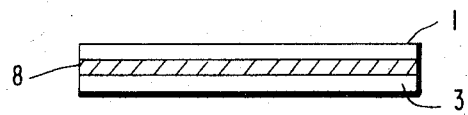
Figure 3:
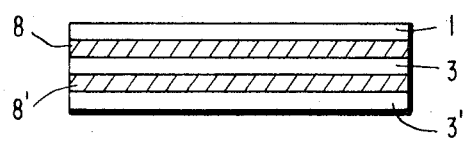

FIG. 2 is a cross-sectional view taken along the line I–I' of the adhesive assembly produced by the step shown in FIG. 1, and FIG. 3 is a cross-sectional view showing aonther embodiment of the adhesive assembly prepared by the process of this invention.

DETAILED DESCRIPTION OF THE INVENTION

As the fluorocarbon resins useful in the present invention, suitable ones are tetrafluoroethylene polymers, trifluoroethylene polymer, tetrafluoroethylene-hexafluoropropylene copolymers, vinylidene fluoride polymers, vinyl fluoride polymers, and the like of these, tetrafluoroethylene, the trifluoroethylene, monochlorotrifluoroethylene, and a copolymer of tetrafluoroethylene and hexafluoropropylene are most preferred.

The second fluorocarbon resin film to be superposed on to the layer of the adhesive material formed on the support may be the same as or different from the first fluorocarbon resin film of the support.

The tretament of providing adhesive power to the surface of the support may be selected as desired from the known methods discussed above.

Known materials may be employed as the pressure-sensitive adhesive material in this invention. Examples of such adhesive materials are a silicone resin, natural rubber, synthetic rubber, and the like.

The temperature for conducting the compression rolling is higher than 25° C. but lower than the melting point of the fluorocarbon resin, for example, lower than about 327° C. in case of the tetrafluoroethylene polymer, lower than about 210–212° C. in case of the trifluoroethylene polymer, lower than about 285° C. in case of the copolymer of tetrafluoroethylene and hexafluoropropylene, lower than about 170° C. in case of the vinylidene fluoride polymer, and lower than about 200° C. in case of the vinyl fluoride polymer. If compression rolling operation as described above is conducted at temperatures lower than 25° C., the electrical properties of the tape cannot be improved sufficiently, while if the rolling operation is conducted at temperatures higher than the melting point of the fluorocarbon polymer, the films of the fluorocarbon polymers composing the outer layers are destroyed and hence the desired laminated film cannot be obtained. In addition, as described above, the temperature of the rolls for compression rolling the laminate is higher than 25° C. and lower than the melting point of the fluorocarbon polymer but it is preferable that the temperature be higher than the thermal deformation point of the fluorocarbon polymer and lower than the melting point thereof. For example, the temperature is preferably between 120° C. and 327° C. in case of the tetrafluoroethylene polymer but for practical purposes, the temperature is preferably lower than 300° C.

The compression rolling of the laminate is conducted between two metallic rolls. It is preferred that the compression rolling be conducted so that the thickness of the film support thus rolled is less than 60% of the original thickness of the support. When the thickness of the rolled film becomes less than 60% of the thickness of the original support film, the tensile strength is greatly increased but if the thickness of the rolled support film becomes less than 30% of the original thickness, the mechanical strength of the support film is reduced since the film is destroyed by the rolling. Accordingly, it is preferable that the thickness of the film rolled be 30–60% of the original thickness. The pressure for rolling depends upon the nature of the materials used, the thickness thereof, and the temperature of rolling, but is generally about 20–100 kg./cm.

In the present invention, an adhesive assembly having a thickness of 15–40 microns can be easily obtained by using a fluorocarbon resin film having an initial thickness of 40–60 microns prepared in a conventional manner. That is, by the process of this invention, a pressure-sensitive adhesive assembly having a thickness of about 30% thinner than the thickness of adhesive assemblies prepared by conventional methods can be obtained.

Now returning to FIG. 1, a fluorocarbon resin film 1 is unrolled from a web 2 of the film and also a pressure-sensitive adhesive film 3 comprising a fluorocarbon film support having coated thereon an adhesive material is unrolled from a web 4. The fluorocarbon tape 1 is superposed onto the pressure-sensitive adhesive film 3 and the resulting laminate is compression rolled between two metallic rolls 5 heated under compression. The fluorocarbon resin film 1 is, after rolling, stripped from the adhesive film 3 and rolled into a web 6, while the adhesive film 3 is also rolled into a web 7.

FIG. 2 is a cross-sectional view of the laminate after rolling taken along the line I–I' in FIG. 1 showing the condition in which the fluorocarbon film 1 is superposed on a layer 8 of an adhesive material applied on the fluorocarbon support.

FIG. 3 is a cross-sectional view showing another embodiment of a laminate after rolling in which a first pressure-sensitive adhesive film comprising a support film 3 having a layer of pressure-sensitive adhesive material 8 thereon is superposed onto another pressure-sensitive adhesive film comprising a support film 3' having a layer of pressure-sensitive adhesive material 8' thereon and further a fluorocarbon resin film 1 is further superposed on the layer 8 of the first pressure-sensitive adhesive film 3. In the embodiment shown in FIG. 3, two pressure-sensitive adhesive films can be obtained by one rolling step. It will further be understood that more than two such adhesive films can be obtained simultaneously in methods similar to the above.

Furthermore, in the process of this invention, one can obtain a pressure-sensitive adhesive assembly having adhesive layers on the opposite sides of the same support by treating the opposite surfaces of a support film to provide adhesivity to the surfaces, applying pressure-sensitive adhesive material onto the treated surfaces, superposing fluorocarbon resin films on each layer of adhesive material, and compression rolling the laminate thus prepared.

In the explanation described above in regard to the figures, the fluorocarbon resin film 1 superposed on the layer of adhesive material is stripped after rolling but as the case may be, the pressure-sensitive adhesive film having superposed thereon the fluorocarbon resin film 1 may be rolled without stripping off the fluorocarbon resin film therefrom after rolling and the fluorocarbon resin film 1 may be stripped from it at the time of use. Of course, the pressure-sensitive adhesive film may be suitably cut into pieces of adhesive sheets and they may be used for various purposes.

As described above, since in the present invention a fluorocarbon resin film having a non-adhesive property or a lubricating property is superposed on the adhesive surface of the pressure-sensitive adhesive film, the adhesive material layer does not transfer onto the surface of the roll at rolling, which facilitates the rolling of the laminate. Therefore, a pressure-sensitive adhesive film having unexpectedly excellent electrical and mechanical properties and also very thin thickness can be obtained. Moreover, because the adhesive thus obtained is transparent, the commercial value of the adhesive is further increased. In addition, because the pressure-sensitive adhesive film obtained by the process of this invention is very thin and hence releases heat well and has less space factor, the adhesive can be used as an electrical insulating material for heat-resisting minute electrical equipment.

The invention will then be explained by reference to the following examples.

EXAMPLE 1

Into a cylindrical metallic mold having an inside diameter of 50 mm. was charged 300 g. of a commercially available film-forming powder of tetrafluoroethylene polymer having a melting point of 372° C. and a molecular weight of $10^6-10^9$. The powder was pre-molded under a pressure of 300 kg./mm.$^2$, and then the molding was baked for 3 hours at 360° C. Thereafter, the product was cooled gradually to room temperature at a rate of 0.7° C./min. to provide a cylindrical molding having an outside diameter of 48 mm. and a length of 62 mm. From the cylindrical product was obtained first tetrafluoroethylene polymer film of 40 microns in thickness by a conventional cutting method.

One surface of the first film thus prepared was treated by a known method with a solution of a sodium complex salt having the composition I shown below to provide an adhesive power to the surface:

Composition I:
    Metallic sodium _____ g__ 23
    Naphthalene _____ g__ 128
    Tetrahydrofuran _____ ml__ 1000

After washing the surface and drying, a known pressure-sensitive adhesive liquid having the following Composition II was applied to the treated surface of the film and dried to provide a pressure-sensitive adhesive film:

Composition II                       Parts by weight
Silicone resin adhesive material (0–280, trade name,
    made by Dow Corning Co., USA) _____ 100
Toluene _____ 300

Onto the adhesive film layer of the pressure-sensitive adhesive thus obtained was superposed a second tetrafluoroethylene polymer film having a thickness of 40 microns and the resulting laminate was compression rolled by passing it through two metallic press rolls heated to 180° C. so that the thickness of the first tetrafluoroethylene polymer film support after rolling became 18 microns, 20 microns or 30 microns by controlling the interval between the metallic rolls. In the above rolling, the rolling pressure was 88, 66 and 27 kg./cm.$^2$, respectively. Thereafter, the second tetrafluoroethylene polymer film was stripped off to provide a pressure-sensitive adhesive assembly having a desired thickness. The properties of the adhesive assembly thus obtained are shown in Table 1. The adhesive strength was measured as follows. The adhesive layer of the pressure-sensitive adhesive assembly of this invention was adhered to a steel surface by means of a roll under a load of 4.15 lb., the assembly was then stripped off at a peeling rate of 300 mm./min. by means of a Schopper's tensile tester, and adhesive strength was measured.

TABLE 1

| Property | (A) | (B) | | |
|---|---|---|---|---|
| | | Test 1 | Test 2 | Test 3 |
| Thickness of support (μ) | 40 | 18 | 20 | 30 |
| Thickness of adhesive (μ) | 20 | 9 | 10 | 15 |
| Adhesive strength (g./25 mm.) | 450 | 212 | 300 | 400 |
| Tensile strength (kg./mm.$^2$) | 2.1 | 7.5 | 6.7 | 3.2 |
| Elongation (percent) | 300 | 56 | 80 | 180 |
| Insulation breakdown potential (KV/0.1 mm.): | | | | |
| (a) | 7.3 | 13.2 | 12.3 | 8.4 |
| (b) | 5.4 | 10.2 | 9.6 | 6.6 |

As shown in Table 1, the adhesive assemblies prepared by the process of this invention were particularly excellent in electrical and mechanical properties. In particular, when the thickness of the film support after rolling was less than 60% of the original thickness, the mechanical strength was greatly increased as shown in Test 1 and Test 2.

EXAMPLE 2

One surface of a film having a thickness of 50 microns prepared by extrusion-molding Daiflon M-300P (trade name of a polytrifluoroethylene resin having a melting point of 212° C. and a molecular weight of $0.7 \times 10^4$, made by Daikin K. K.) was treated with the sodium complex salt solution as in Example 1 and after washing and drying, the same procedure as used in Example 1 was followed to provide a pressure-sensitive adhesive assembly having a thickness of 20 microns. Then, a tetrafluoroethylene polymer film having a thickness of 40 microns as in Example 1 was superposed on the adhesive layer of the adhesive assembly and then the laminate was rolled by passing it through two metallic rolls heated to 130° C. while controlling the interval of the rolls so that the thickness of the trifluoroethylene polymer film support decreased to 40 microns or 20 microns. In this case, the rolling pressure was 14 kg./cm. and 130 kg./cm., respectively. By stripping the tetrafluoroethylene polymer film, a pressure-sensitive assembly adhesive having a desired thickness was obtained. The properties are shown in Table 2.

TABLE 2

| Property | A | B | |
|---|---|---|---|
| | | Test 1 | Test 2 |
| Thickness of support (μ) | 50 | 40 | 20 |
| Thickness of adhesive (μ) | 20 | 16 | 8 |
| Adhesive strength (g./25 mm.) | 470 | 450 | 220 |
| Tensile strength (kg./mm.$^2$) | 4.5 | 5.3 | 10.1 |
| Elongation (percent) | 60 | 50 | 30 |
| Insulation breakdown potential (KV/0.1 mm.): | | | |
| (a) | 8.6 | 9.2 | 13.5 |
| (b) | 6.9 | 7.3 | 10.6 |

What is claimed is:

1. A process for the production of a pressure-sensitive adhesive assembly consisting essentially of a first fluorocarbon resin film support and a pressure-sensitive adhesive material coated on at least one side thereof and strongly bonded thereto, said process comprising:
   etching at least one surface of said first fluorocarbon resin film support to provide adhesivity to said surface;
   applying said pressure-sensitive adhesive material to the surface of said first fluorocarbon resin film support thus treated;
   superposing a second fluorocarbon resin film on the adhesive layer thus formed; and
   compressing the resulting laminate between rolls heated to a temperature of higher than 25° C., and lower than the melting point of the fluorocarbon resin to reduce the thickness of said laminate, said second fluorocarbon resin film being easily strippable from said laminate to provide said pressure-sensitive adhesive assembly.

2. The process as claimed in claim 1, wherein the laminate is compressed sufficiently to reduce the thickness of said first fluorocarbon resin film support to a thickness of less than 60% of the original thickness thereof.

3. The process as claimed in claim 1, wherein the temperature of the compression rolling is lower than the melting point of said fluorocarbon resin and higher than the thermal deformation point of said fluorocarbon resin.

4. The process as claimed in claim 1, wherein the laminate is compressed sufficiently to reduce the thickness of said first fluorocarbon resin film support to a thickness of from 30 to 60% of the original thickness thereof.

5. The process as claimed in claim 4, wherein said second fluorocarbon resin film is stripped from said laminate after said compression rolling step to provide said pressure-sensitive adhesive assembly.

6. The process as claimed in claim 5 wherein said pressure-sensitive adhesive assembly has a total thickness of from 15 to 40 microns and wherein the original thickness of said first fluorocarbon resin film support varies from 40 to 60 microns.

7. The process as claimed in claim 5 wherein the pressure exerted on said laminate in said compressing step is from about 20 to 100 kilograms per centimeter of roll length.

8. The process as claimed in claim 5 wherein said etching step comprises treating said surface of said first fluorocarbon resin film support with a solution of a sodium-naphthalene-tetrahydrofuran complex or a sodium-liquid ammonia solution.

9. The process as claimed in claim 5 wherein said first and second fluorocarbon resins are the same.

10. The process as claimed in claim 5 wherein said first and second fluorocarbon resins are different.

11. The process as claimed in claim 5 wherein said pressure-sensitive adhesive material is a silicone resin, a natural rubber or a synthetic rubber.

12. The process as claimed in claim 5 wherein pressure-sensitive adhesive material is provided on one surface of said first fluorocarbon resin film support.

13. The process as claimed in claim 5 wherein said pressure-sensitive adhesive material is provided on both surfaces of said first fluorocarbon resin film support.

14. The process as claimed in claim 1, wherein the fluorocarbon resin is a tetrafluoroethylene polymer.

15. The process as claimed in claim 14 wherein said temperature varies from 25 to 327° C.

16. The process as claimed in claim 1, wherein the fluorocarbon resin is a trifluoroethylene polymer.

17. The process as claimed in claim 16 wherein said temperature varies from 25 to 212° C.

18. The process as claimed in claim 1, wherein the fluorocarbon resin is a copolymer of tetrafluoroethylene and hexafluoropropylene.

19. The process as claimed in claim 18 wherein said temperature varies from 25 to 285° C.

References Cited

UNITED STATES PATENTS

| | | | |
|---|---|---|---|
| 1,776,141 | 9/1930 | Bibb et al. | 156—247 X |
| 2,765,241 | 10/1956 | Wayne | 117—76 |
| 2,789,063 | 4/1957 | Purvis et al. | 161—189 X |
| 2,809,130 | 10/1957 | Rappaport | 161—189 X |
| 2,871,144 | 1/1959 | Doban | 161—189 X |
| 3,063,882 | 11/1962 | Cheshire | 161—189 |
| 3,067,078 | 12/1962 | Gluck | 161—189 X |
| 3,507,733 | 4/1970 | Davidson | 156—323 X |
| 3,600,289 | 8/1971 | Bragole | 161—189 X |
| 3,649,325 | 3/1972 | Affeldt | 117—65.2 |

HAROLD ANSHER, Primary Examiner

U.S. Cl. X.R.

117—47 A, 65.2; 156—247, 323; 161—189